April 7, 1936. J. A. HAMBLY 2,036,213
TREATMENT OF BLACK LIQUORS
Filed June 7, 1933
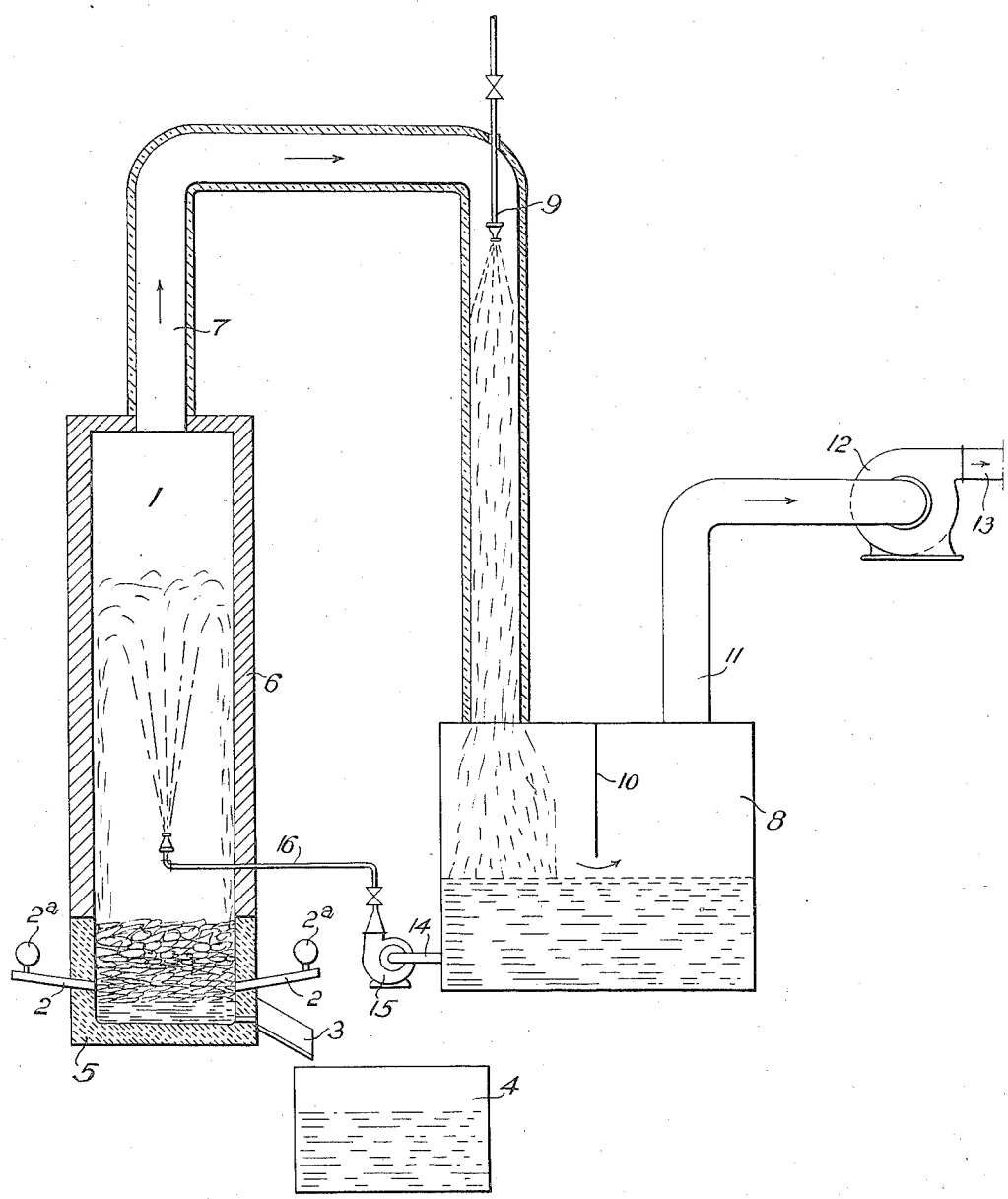
INVENTOR:
JOHN ARTHUR HAMBLY
BY H. E. MacRae
ATTORNEY Patented Apr. 7, 1936

2,036,213

UNITED STATES PATENT OFFICE 2,036,213

TREATMENT OF BLACK LIQUORS

John Arthur Hambly, Three Rivers, Quebec, Canada, assignor to Consolidated Paper Corporation Limited, Montreal, Quebec, Canada Application June 7, 1933, Serial No. 674,700

9 Claims. (Cl. 23—48)

This invention relates to the treatment of waste liquors from chemical methods of treating wood or like cellulosic material in the production of pulp or paper and is particularly directed to the recovery of chemical and heat values from such liquors.

In the treatment of cellulosic material for the production of pulp particularly by alkali chemical methods, the waste liquors, usually known as black liquor, contain valuable chemical and heat generating constituents, the recovery of which is of great economic importance.

Various methods for their recovery have been proposed but numerous difficulties have been encountered in their use in commercial practice. Multiple-effect evaporators have been used to greatly increase the solid content of the concentrated liquor. The liquor has been evaporated to dryness in rotary evaporators in which the liquor is directly heated by gases from furnaces in which the dry black ash is burned. The concentrated liquor has been sprayed into the smelting furnace in the bottom of which the black ash is burned by the introduction of air, and excess air introduced completed the oxidation or combustion of any gases not completely oxidized in the smelting zone, the heat thus generated causing the vaporization of the liquor, and the completely burned hot gases thus formed have been used for the generation of steam and like purposes. In burning the gases in this manner high temperatures are developed and, owing to the presence of alkaline salts, difficulties are caused by the fluxing action on the lining of the combustion chamber or ducts leading to the boiler. Furthermore, the boiler, providing a cooling surface for the gases, causes heavy deposition of salts on the boiler surfaces, thus greatly lowering its efficiency and requiring frequent cleaning. In addition substantial amounts of the salts which should be recovered are carried away with the gases leaving the boiler and can only be regained by the use of additional scrubbing equipment.

The object of the present invention is to provide a simple and direct method and apparatus whereby the desired chemical constituents may be recovered from the waste liquor for reuse, and whereby a readily combustible gas may be formed from remaining constituents of the liquor and utilized, as a producer gas, for steam generation or other purposes, quite independently of the burning of the black ash. Other objects of the invention are, to avoid the corrosive and fluxing action at high temperatures of the alkali constituents of the liquor; to avoid substantial formation of carbon dioxide in the treatment of the liquor, as this gas causes precipitation from the liquor of ligneous material which obstructs the pipe lines and adheres to other equipment; to maintain the circulating black liquor at a raised temperature, thus reducing its viscosity and facilitating its flow, and to remove from the combustible, or so-called producer, gas formed, alkali and black ash particles as well as condensible organic matter, before the gas is burned for steam generation or other purposes.

A further object of the invention is to greatly improve the efficiency of the utilization of the heat units available in these waste liquors.

A still further object of the invention is to provide a simple and relatively inexpensive apparatus for treating such liquors, which is efficient and economical in operation.

The invention thus contemplates the operation of a black ash smelting chamber on the principle of the well known gas producer and the preheating of the black liquor by direct contact with the producer gas thus formed, the latter at the same time being washed with the incoming liquor to remove solid particles and condensible organic matter carried thereby. Accordingly the smelting chamber is operated to burn the black ash in the lower smelting zone thereof and evaporate the black liquor in a higher zone so as to produce a combustible gas containing essentially carbon monoxide, hydrogen and hydrocarbons, and the required amount of air therefor is admitted to the smelting zone only.

The invention will now be described with reference to the accompanying drawing, which illustrates more or less diagrammatically a form of apparatus for carrying out the process.

In the drawing, 1 represents a smelting furnace, provided with tuyeres or the like 2, supplied with air from the main 2a and an outlet 3 which may discharge into any suitable receptacle 4. The lower portion of the furnace is provided with a refractory lining 5 which will resist the fluxing action of the black ash which is fused or smelted therein. The upper part of the furnace is provided with a lining 6 which will resist the action of the liquor and gases in a manner well known in the art. A gas outlet 7 leads from the smelting chamber to a separator 8 and means 9 are provided for spraying the black liquor into the pipe 7, as indicated. The separator 8 is provided with a depending baffle 10 and gas outlet 11 which is connected to a fan 12 having a discharge pipe 13. The separator has a liquor outlet 14 connected to a pump 15 which delivers the liquor in the form of a spray in the smelting chamber by means of the pipe 16.

The operation of the process is as follows: At the beginning of operation the temperature in the smelting chamber 1 is raised in any desired well known manner. Black liquor from the separator 8 is then sprayed into the furnace by means of the pump 15 and the liquor is evaporated by the heat in the furnace, forming porous lumps and particles of black ash which fall upon the furnace bed where they are smelted by admission of air through the tuyères 2. In contrast with previously known methods, the furnace is operated as a gas producer; that is to say, the amount of air admitted is so controlled as to form a producer gas which is withdrawn from the furnace by means of the fan 12 and used quite independently of the operation of the furnace for generating steam or like purposes. No auxiliary air is admitted so that the producer gas formed is not further oxidized in the furnace or in the duct leading therefrom. Under these conditions only part of the heat available in the constituents of the black ash is liberated in the furnace and the temperatures so developed in the major portion of the furnace are not such as to cause fluxing of the furnace lining. The lining 5 of the smelting zone is but a small portion of the furnace wall and may be economically made of special refractory brick.

The combustible gas generated in the smelting chamber, consisting essentially of carbon monoxide, hydrogen and hydrocarbons, is withdrawn by the fan 12 and in passing through the duct 7 is sprayed with black liquor, as indicated. In this way the hot gas is washed free from alkali and black ash particles, as well as condensible organic matter, all of which returns to the smelting zone with fresh liquor. At the same time, the gas gives up much of its heat to the incoming liquor. The liquor accumulates in the separator 5 while the gas passes on through the fan to the external point of consumption.

Several outstanding advantages of the process may be mentioned. Owing to the lower temperatures prevailing in the furnace, fluxing of the lining in the presence of the alkaline salts, which ordinarily constitutes a problem, is avoided. The producer gas reaction being employed, the volume of gas produced in the furnace is much less than that ordinarily formed, and the washing or scrubbing of the gas is greatly simplified with a more complete recovery of the alkaline salts. Furthermore, the gas being substantially free from carbon dioxide, ligneous material is not precipitated from the liquor to obstruct its flow or the efficient use of the gas. The incoming black liquor being heated by contact with the gas is maintained at a reduced viscosity and consequently is more readily handled by the pump and spray pipe. The combustion of the producer gas for steam generating or other purposes is quite independent and thus removed from the fluxing reactions of the alkali, as well as the marked tendency for the alkali to deposit on the boiler surfaces. Constant and close supervision in the cleaning and operation of the boiler is thus avoided and its heating efficiency is increased.

It is obvious that greatest heating efficiency is obtained by the use of a clean combustible gas and such a gas is obtained herein by the direct treatment of the waste liquor.

The relative simplicity of the present apparatus and its manner of operation will be apparent from the description given and it is obvious that various changes may be made in the construction of the apparatus and in the operation of the process without departing from the spirit and scope of the present invention as defined in the appended claims.

While the invention has been particularly described with reference to the treatment of black liquor from the pulp and paper industry, it is applicable to the treatment of other liquors of a generally similar character for the recovery of values contained therein.

The term "gas producer" as used herein and in the appended claims is to be understood as having its ordinary technical meaning, wherein a combustible gas consisting essentially of carbon monoxide, hydrogen and hydrocarbons is produced.

I claim:

1. In the treatment of waste liquor containing recoverable chemicals and heat generating constituents, the method which comprises spraying said liquor into a smelting chamber above a smelting zone therein, burning in said smelting zone solid particles liberated from the liquor while admitting to said chamber only sufficient air to form producer gas substantially free from carbon dioxide, withdrawing said unburned producer gas from said chamber and washing the same with waste liquor to remove therefrom alkali salts.

2. In the treatment of waste liquor containing recoverable chemicals and heat generating constituents, the method which comprises burning in the lower portion of a smelting furnace particles of solid materials liberated from said liquor in the presence of only sufficient air to form producer gas substantially free from carbon dioxide, spraying said liquor into the smelting furnace in contact with said mixture of gases, withdrawing said producer gas in an unburned condition from said chamber and washing the same with waste liquor to remove therefrom alkali salts.

3. A method as defined in claim 1, wherein said liquor is preheated before being admitted to said chamber by contact with said producer gas.

4. A method of recovering values from black liquor which comprises treating said liquor in a smelting chamber operated as a gas producer without substantial production of carbon dioxide, removing the combustible gas mixture so produced from the chamber into contact with a portion of said liquor to preheat the latter and to remove from the gas solid particles and condensible organic matter, and separating said gas from the preheated liquor.

5. A method of recovering values from black liquor which comprises spraying the liquor into a smelting chamber above a smelting zone therein, burning in said smelting zone without substantial formation of carbon dioxide solid particles liberated from said liquor by heat of combustion in said zone, withdrawing the producer gas so formed from said chamber and the fused black ash from said smelting zone and washing said producer gas with waste liquor to remove therefrom alkali salts.

6. A method as defined in claim 5 wherein the producer gas is freed from solid particles by contact with liquor passing to said smelting chamber.

7. A method of recovering values from black liquor which comprises treating the liquor in a smelting chamber to form producer gas and a fused black ash, withdrawing the producer gas from the smelting chamber and removing corrosive alkali particles therefrom before subjecting it to combustion.

8. In the recovery of salts and heat values from waste liquor the method which comprises treating said liquor in a smelting chamber to form producer gas substantially free from carbon dioxide by combustion of solid particles liberated from said liquor, withdrawing said producer gas from the chamber, removing alkali particles therefrom and returning said particles to the smelting chamber for recovery with fresh liquor.

9. In the recovery of alkali salts and heat values from waste liquor the method which comprises treating a preheated black liquor in a smelting chamber to produce a relatively small volume of combustible gas substantially free from carbon dioxide and solid particles which are burned in said chamber without fluxing of the chamber lining, withdrawing said unburned producer gas from said chamber and washing the same with incoming liquor to preheat the latter and remove from the gas and recover chemicals leaving a combustible gas free from corroding particles.

JOHN ARTHUR HAMBLY.